United States Patent [19]

Abe

[11] 4,311,434
[45] Jan. 19, 1982

[54] WIND TURBINE
[75] Inventor: Minoru Abe, Kashiwa, Japan
[73] Assignees: Agency of Industrial Science & Technology; Ministry of International Trade & Industry, both of Tokyo, Japan
[21] Appl. No.: 243,379
[22] Filed: Mar. 13, 1981
[30] Foreign Application Priority Data
Apr. 7, 1980 [JP] Japan .................................. 55-45438
[51] Int. Cl.³ .............................................. F03D 11/04
[52] U.S. Cl. ..................................... 416/142; 416/9
[58] Field of Search ................................ 416/9, 142 B
[56] References Cited

U.S. PATENT DOCUMENTS

| 546,710 | 9/1895 | Rogers | 416/9 X |
| 756,216 | 4/1904 | Crunican | 416/9 |
| 756,616 | 4/1904 | Fornander | 416/9 |
| 992,067 | 5/1911 | Sawyers | 416/142 B X |
| 4,142,830 | 3/1979 | Schonball | 416/142 B X |
| 4,217,738 | 8/1980 | Smith | 416/142 B X |

FOREIGN PATENT DOCUMENTS

| 735210 | 5/1943 | Fed. Rep. of Germany | 416/9 |
| 830180 | 1/1952 | Fed. Rep. of Germany | 416/142 B |
| 2735298 | 2/1979 | Fed. Rep. of Germany | 416/142 B |
| 2823525 | 8/1979 | Fed. Rep. of Germany | 416/142 B |
| 2817483 | 10/1979 | Fed. Rep. of Germany | 416/9 |

*Primary Examiner*—Everette A. Powell, Jr.
*Attorney, Agent, or Firm*—Kurt Kelman

[57] ABSTRACT

The improvement in a wind turbine comprises providing a tower with a freely liftable mount and adapting a nacelle which is fitted with a propeller windwheel consisting of a plurality of rotor blades and provided therein with means for conversion of wind energy to be shifted onto said mount attached to the tower. In case of a violent wind storm, the nacelle can be lowered down to the ground to protect the rotor blades from breakage due to the force of the wind. Required maintenance and inspection of the nacelle and replacement of rotor blades can be safely carried out on the ground.

2 Claims, 4 Drawing Figures

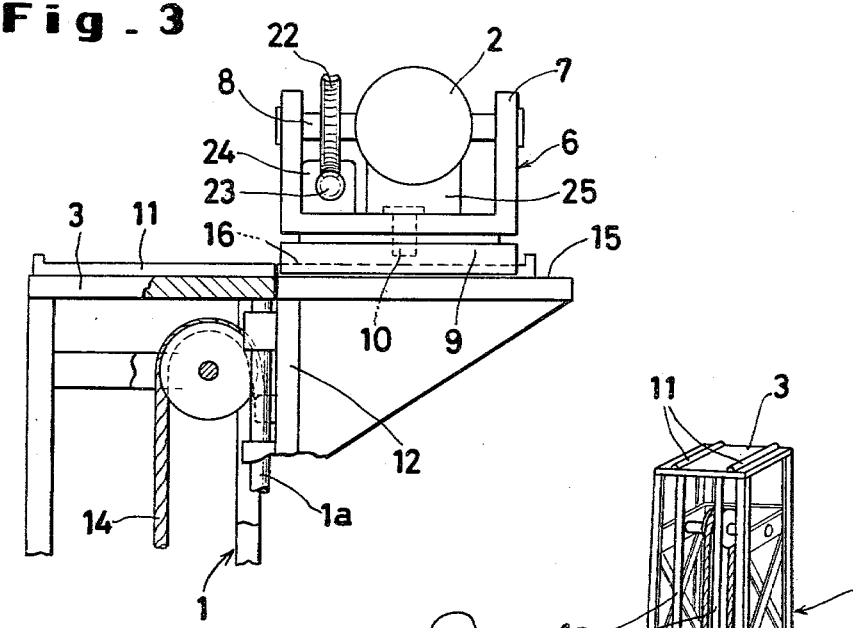
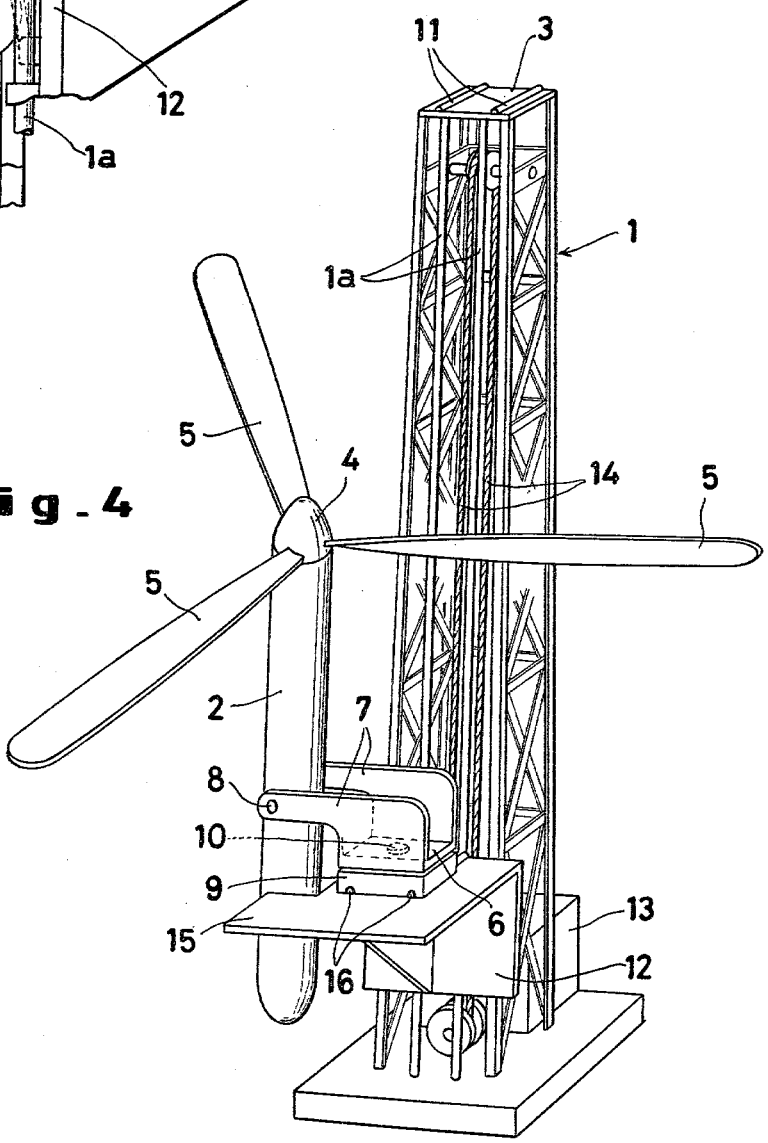

WIND TURBINE

BACKGROUND OF THE INVENTION

This invention relates to a wind turbine. A wind turbine is a device for converting the energy of wind into mechanical rotary energy through the medium of a propeller type windwheel possessed of a plurality of rotor blades and further converting this mechanical rotary energy into electric energy by, for example, an electric generator. The operating condition of the wind turbine varies with the velocity of the wind. Specifically, the revolution number and torque of the windwheel increase and the loads such as the force of air and the centrifugal force which are exerted on the rotor blades are also increased in proportion as the velocity of wind increases. To fix the revolution number of the rotor blades, the motion of the blades is controlled by means of a variable pitch mechanism, for example. This control mechanism, however, fails to provide the expected control when the blades are exposed to a wind of unusually high velocity such as those encountered during a typhoon. Under the great pressure of the wind, the rotor blades and the rotation system of the motor may, in an extreme case, even break. The wind turbine, therefore, has an evident need of being provided with a safety measure to preclude breakage.

The rotor blades in the majority of the existing windwheels are made of glass fiber and aluminum. They must be given maintenance and inspection at fixed intervals of once at least several months. At times, they must be replaced. In some of the existing wind turbines, the propeller type windwheels are installed on towers which stand 50 to 60 meters from the ground level. The replacement of rotor blades and the maintenance and inspection given to the interior of the nacelle, accordingly, have entailed extremely dangerous work at great heights.

As one kind of the safety measure of the type mentioned above, there has been proposed a method which comprises making the tower on which the windwheel is mounted collapsible into an upper half and a lower half interconnected to each other through an intervening hinge and providing a weight at the lower end of the tower so that the whole tower can remain upright during normal operation of the wind turbine and enabling the upper half of the tower to be lowered to the horizontal about the hinge in the case of violent storm or other emergency or when maintenance and inspection are necessary. The upper half of the tower is held in the horizontal position until the emergency is over (Japanese Utility Model Publication No. 5044/1948).

In the method described above, since the rotor blades and the nacelle are fixed on the top of the tower, it is only when the height of the tower is not great that the rotor blades and the nacelle are brought down close to the ground after the upper half of the tower has been lowered. Since the upper half of the tower carrying the rotor blades is simply made horizontal, there still is a possibility of the rotor blades being broken by the force of a strong wind. In the case of a tower standing 50 to 90 m from the ground level and carrying thereon a large rotor having a diameter reaching even 100 m, it is extremely difficult to provide the tower in the middle thereof with a hinge. Even if the tower can be constructed so that the upper half thereof can be laid horizontally, the rotor blades and the nacelle are still 30 to 50 m above the ground level. Maintenance and inspection work is still dangerous. The replacement of the rotor is not easy to accomplish. Thus, the method has been applicable only to towers of small heights.

SUMMARY OF THE INVENTION

An object of this invention is to provide a wind turbine which enables the rotor blades and the nacelle to be easily brought down close to the ground level as required without reference to the diameter of the rotor blades and the height of the tower, protects the rotor blades against possible breakage due to the force of violent winds, and permits easy maintenance, inspection and replacement of the rotor blades and the nacelle.

To accomplish the object described above according to the present invention, there is provided a wind turbine which is provided on the tower thereof with a freely liftable mount adapted to enable the nacelle which is fitted with a propeller type windwheel consisting of rotor blades and encloses therewith a motor to be lowered wholly to the ground level.

As described above, this invention permits lowering of the nacelle to the ground level at will, no matter how tall the tower may be. Thus, the maintenance, inspection and replacement of the rotor and the nacelle can be easily carried out without entailing any dangerous work at high places. Since the rotor can be easily brought down close to the ground level, steps for the protection of the rotor against breakage can be easily taken in case of storms.

The other objects and characteristics of this invention will become apparent from the further disclosure of the invention to be given hereinbelow with reference to the accompanying drawings.

BRIEF DESCRIPTION OF THE DRAWING

FIG. 3 is a rear view of the mechanism for providing a vertical rotation for the nacelle in the wind turbine of FIG. 1.

FIG. 4 is a perspective view of the wind turbine of this invention, with the nacelle thereof brought down close to the ground.

DESCRIPTION OF THE PREFERRED EMBODIMENT

Figure 1:
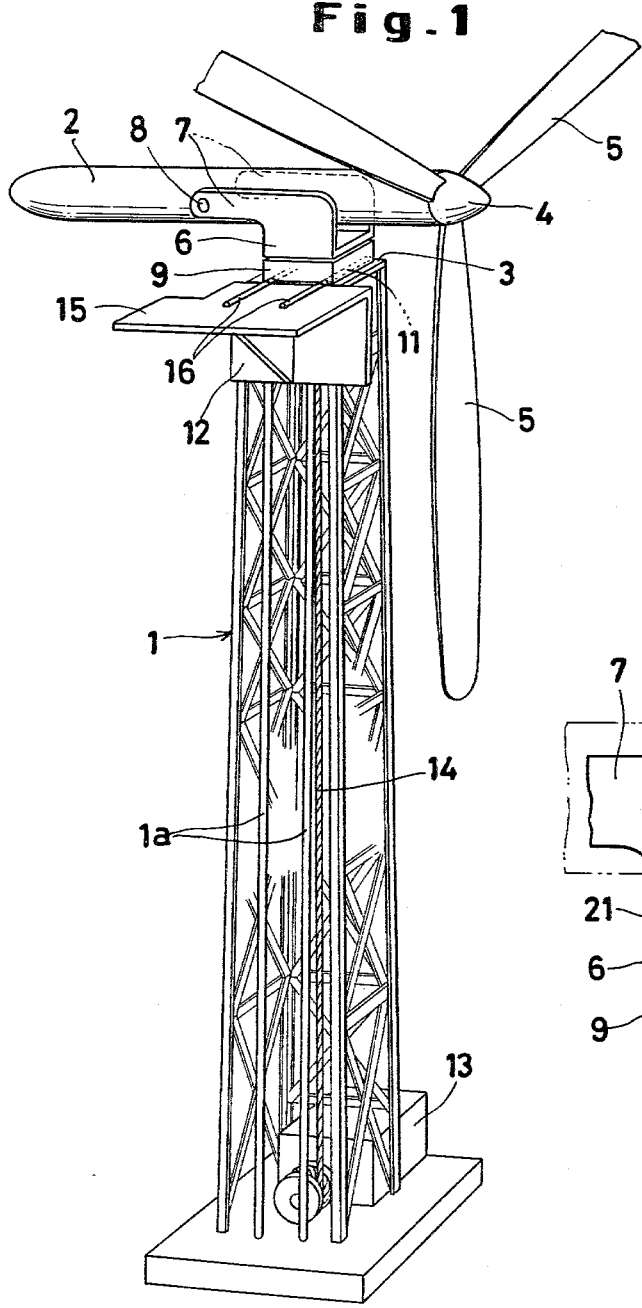
FIG. 1 is a perspective view of the wind turbine of the present invention in its operating condition.

As illustrated in FIG. 1, a tower 1 is provided at the upper end thereof with a seat 3 for mounting thereon a nacelle 2. On this seat 3, the nacelle 2 is installed through the medium of a base 9. The nacelle 2 is possessed of a propeller type windwheel comprising a rotor head 4 and a plurality of rotor blades 5 attached to the rotor head, and incorporates therein an electric generator (not shown) connected to the aforementioned propeller type windwheel. The nacelle 2 is supported between the leading ends of parallel arms 7 laterally protruding from a supporting member 6 and is enabled by a rotary mechanism to be freely rotated around a horizontal shaft 8 and fixed at a desired angle. Further, the supporting members 6 for the nacelle 2 are attached to the base 9 so that they can be freely rotated about a vertical shaft 10 and fixed at a desired angle. The base 9 is engaged with rails 11 provided on the seat 3 at the top of the tower 1 so that it can be moved on the seat along the rails 11 when necessary. Normally, the base 3 is held fast to the tower 1 by an engaging means remotely controllable from the ground.

The aforementioned tower 1 is provided on one lateral side thereof with a freely liftable mount 12. This mount 12 is adapted to be lifted up or lowered down along guides 1a provided on the tower 1 by means of a rope 14 which is wound up on a windlass 13 operated with an electric motor. This mount 12 is provided on the upper surface thereof with a seat 15 incorporating rails 16 similarly to the seat 3 on the tower 1. When the mount 12 is at the upper terminal of its vertical travel, the nacelle 2 on top of the tower 1 is allowed in conjunction with the base 9 to move sideways along the rails 11, 16 which are interconnected to each other. Thus, the nacelle 2 can move onto the seat 15 from the seat 3.

Figure 2:
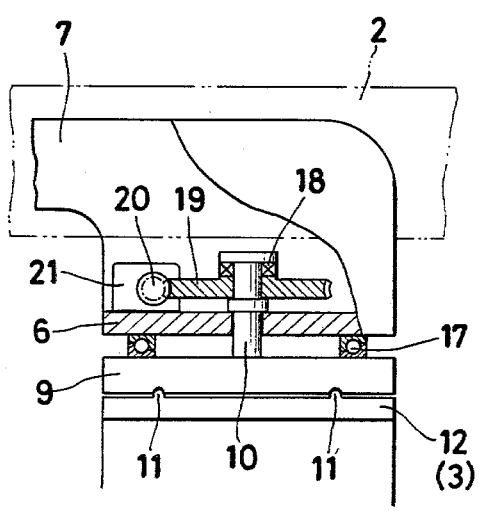
FIG. 2 is a partially sectioned view of the nacelle rotation control mechanism provided on top of the tower of the wind turbine of FIG. 1.

While the windwheel is rotating, the supporting member 6 of the nacelle rotates freely about the vertical shaft 10 of the base 9, depending on the direction in which the wind is blowing. When the nacelle 2 needs maintenance and inspection, for example, it may be necessary for the supporting member 6 to be fastened onto the base 9. One typical mechanism available for that purpose is illustrated in FIG. 2. The shaft 10 is fixed to the base 9 and the supporting member 6 is set in position on the base through the medium of a thrust bearing 17. The supporting member 6 is provided at the center thereof with a through hole for passing the shaft 10. The portion of the shaft 10 which protrudes from the supporting member 6 is fitted with a worm gear 19. This worm gear 19 is fastened to the shaft 10 or separated from the shaft by the operation of a clutch 18. The worm gear 19 is meshed with the worm 20 formed on the drive shaft of the motor 21 fastened on the supporting member 6. When the connection between the shaft 10 and the worm gear 19 is released by the clutch 18, the supporting member 6 is allowed to rotate freely on the base 9. When they are brought into connection by the clutch 18, the supporting member 6 is indirectly fastened onto the base 9, with the result that the supporting member 6 is rotated by the motor 21 at a desired angle relative to the base 9. Illustrated in FIG. 2 is one example of the mechanism available for this purpose. Thus, the worm gear may be replaced by a cylindrical gear. When the windwheel is small, the supporting member 6 can be rotated manually instead of by motor.

When the nacelle 2 is mounted on the seat 15 of the mount 12 and lowered down the tower 1, the windwheel is turned upwardly and the nacelle 2 is kept in its upright position. A typical example of the mechanism which is capable of moving the nacelle 2 from its horizontal position to the vertical position is illustrated in FIG. 3. A worm gear 22 is fastened to the horizontal shaft 8 supporting the nacelle. This worm gear 22 is meshed with a worm 23 fastened to the drive shaft of the motor 24 which is fastened to the supporting member 6. When the motor 24 is rotated, therefore, the shaft 8 is slowly rotated to raise the nacelle 2. The raised nacelle 2 is returned to its horizontal position by rotating the motor 24 backwardly. When the nacelle is large and the load it exerts on the shaft 8 is too much to be borne safely, a nacelle-receiving member 25 provided at the leading end of the supporting member 6 enables the nacelle 2 to be stably maintained in its horizontal position.

Now, the operation of the wind turbine which is constructed as described above will be described.

During the normal operation of the wind turbine, the nacelle 2 is set in position on the seat 3 on top of the tower 1 through the medium of the base 9 and the wind-driven propeller windwheel is put to work as held facing upwind or downwind. To fix the direction of the nacelle 2, the supporting member 6 may be left freely rotating about its axis and consequently made to assume a direction by the force of the wind. To turn the nacelle 2 toward the wind, the clutch 18 is operated to interconnect the shaft 10 and the supporting member indirectly and the motor 21 is rotated to turn the supporting member 6 in a desired direction relative to the base 9. (FIG. 2) While the windwheel is operating normally, the mount 12 may be lowered down to the lower end of the tower or even removed from the tower.

When the wind turbine is to be readied for an approaching violent wind such as a typhoon or when the rotor blades 5 are to be replaced or the nacelle 2 is to be given maintenance and inspection, the mount 12 is lifted up until the upper surface of the seat 15 comes flush with that of the seat 3 on top of the tower 1 and the base 9 is moved sideways and shifted onto the mount 12. While the base 9 is being moved onto the mount 12, the nacelle 2 is desired to be kept perpendicularly relative to the direction of the movement.

The base 9 is moved after the upper surface of the seat 15 has been flush with that of the seat 3 and the rails 11 have been joined with the rails 16. One typical method for effecting this movement of the base 9 onto the mount 12 involves providing the rails 11, 16 with respective racks, providing the base 9 on the bottom side thereof with pinions adapted to be engaged with the aforementioned racks and rotating the pinions by the motor provided on the base 9.

After the base 9 has been moved onto the mount 12, it should be confirmed that the rotor blades 5 are positioned so as not to come into touch with the tower 1. Then, the rotor blades are fixed to the nacelle 2 by actuating the braking mechanism (not shown) provided on the propeller shaft within the nacelle 2. Subsequently, the motor 24 is operated to turn the propeller windwheel upwardly about the horizontal shaft 8. After the nacelle 2 has assumed an upright position, the motor 24 is stopped. The nacelle 2 is then lowered down to the ground as illustrated in FIG. 4 by lowering the mount 12 by means of the rope 14.

The rotations of the nacelle 2 and the supporting member 6, the movement of the base 9 and the vertical movement of the mount 12 can be obtained not merely by the mechanisms described above but also by other mechanisms making use of suitable drive means operating on hydraulic or electrical principles. It is advantageous for such mechanisms to be adapted for remote control from the ground. The component parts of such mechanisms may be installed at suitable positions within the nacelle and the base, on the tower and the mount 12.

As described above, the wind turbine of this invention enables the nacelle 2 to be lowered down to the ground level. As a result, the rotor blades and the rotary system can be protected against breakage by the force of violent winds. When the rotor blades are to be replaced or the nacelle is to be given maintenance and inspection, the work involved can be safely and quickly carried out on the ground.

The return of the nacelle to its original position on the tower is accomplished simply by reversing the procedure previously followed in lowering the nacelle.

The angle of the nacelle in the vertical direction can be freely adjusted to suit the direction and velocity of the prevailing wind. The principle of this invention can be applied to a farm windmill which simply serves to convert wind energy into mechanical energy.

As described in detail above, since this invention contemplates giving the wind turbine a structure wherein the tower is provided with a freely liftable mechanism incorporating a mount by means of which the nacelle to be positioned on top of the tower will be lifted up and lowered down the tower, it provides protection of the rotor blades and the rotary mechanism during violent wind storms and permits reliable and safe maintenance and inspection of the nacelle. Since the mount 12 is adapted to be lifted up and lowered down the tower while holding the nacelle fast in a vertical position thereon, the nacelle can be easily lifted up and lowered down the tower while keeping rotor blades of even a great length mounted fast thereon.

What is claimed is:

1. A wind turbine, comprising in combination a tower, a seat set in position on top of said tower and adapted to mount a nacelle thereon, a nacelle fitted with a propeller type windwheel consisting of a plurality of rotor blades and provided therein with means for converting the wind energy, a base adapted to support thereon said nacelle and attached to said seat for mounting the nacelle, means for supporting said nacelle freely turnable on said base, a mount set in position on the lateral side of said tower, a seat formed on said mount and adapted to mount said nacelle fast thereon, means for moving said mount up and down to permit said mount to be lifted until the upper surface of the seat on the mount becomes flush with that of the seat on the upper end of the tower and enable said mount to be lowered down to the ground level, and means for enabling the base to be shifted on the two seats after the upper surface of the seat of the mount comes flush with that of the seat on the tower.

2. The wind turbine according to claim 1, wherein the nacelle is supported freely rotatably on said base.

* * * * *